(12) United States Patent
Mrkvicka et al.

(10) Patent No.: US 8,460,560 B2
(45) Date of Patent: Jun. 11, 2013

(54) VARIABLE INFLUENT FLOW CHANNEL BAFFLE

(75) Inventors: Rodney S. Mrkvicka, Leawood, KS (US); John K. Kelly, Overland Park, KS (US)

(73) Assignee: Smith & Loveless, Inc., Lenexa, KS (US)

( * ) Notice: Subject to any disclaimer, the term of this patent is extended or adjusted under 35 U.S.C. 154(b) by 385 days.

(21) Appl. No.: 12/818,355

(22) Filed: Jun. 18, 2010

(65) Prior Publication Data

US 2011/0308661 A1 Dec. 22, 2011

(51) Int. Cl.
*B01D 21/24* (2006.01)
*B01D 21/26* (2006.01)
*B04C 3/06* (2006.01)

(52) U.S. Cl.
CPC ........... *B01D 21/2411* (2013.01); *B01D 21/26* (2013.01); *B04C 3/06* (2013.01)
USPC ........ 210/788; 210/801; 210/154; 210/512.1; 210/519; 29/890.09; 137/546; 405/119

(58) Field of Classification Search
USPC .............. 210/787, 788, 800, 801, 154, 512.1, 210/519, 532.1; 29/890.09; 137/544, 546; 405/118, 119
See application file for complete search history.

(56) References Cited

U.S. PATENT DOCUMENTS

| | | | |
|---|---|---|---|
| 2,025,722 A | 12/1935 | Camp | |
| 2,281,826 A | 5/1942 | Camp | |
| 2,425,932 A * | 8/1947 | Green | 210/788 |
| 2,573,905 A | 11/1951 | Hapman | |
| 3,891,557 A * | 6/1975 | Edgerton | 210/519 |
| 3,941,698 A | 3/1976 | Weis | |
| 3,962,084 A * | 6/1976 | Nussbaum | 210/801 |
| 4,107,038 A | 8/1978 | Weis | |
| 4,767,532 A | 8/1988 | Weis | |
| 5,298,172 A | 3/1994 | Smith | |
| 5,300,220 A * | 4/1994 | McEwen | 210/154 |
| 5,565,103 A | 10/1996 | Eto | |
| 5,591,348 A * | 1/1997 | Felder et al. | 210/512.1 |

(Continued)

OTHER PUBLICATIONS

International Search Report dated Sep. 7, 2011.

(Continued)

*Primary Examiner* — Christopher Upton
(74) *Attorney, Agent, or Firm* — Wood, Phillips, Katz, Clark & Mortimer

(57) ABSTRACT

An input channel (and method of making an input channel) for the flow of waste water into a grit removal unit. The input channel has a depth D extending from the bottom to the top of the channel. One sidewall of the channel is configured to vary the channel width over the depth of the channel, whereby (a) the width at the bottom of the channel is $W_B$, (b) the width at the top of the channel is $W_T$, and (c) the width at channel depth "d" above the bottom of the channel is $W_d$, wherein (i) $0 \leq d \leq D$, (ii) $W_B < W_T$, and (iii) $W_d$ is greater than or equal to the channel widths at substantially every channel depth less than "d". The channel profile may be integral to the channel, or defined by a separately added component, and selectively be stepped, tapered and/or curved.

18 Claims, 11 Drawing Sheets

U.S. PATENT DOCUMENTS

| | | | |
|---|---|---|---|
| 5,695,655 A | 12/1997 | Smati | |
| 5,759,415 A * | 6/1998 | Adams | 210/519 |
| 6,598,352 B2 | 7/2003 | Higginbotham | |
| 6,811,697 B2 | 11/2004 | Davis et al. | |
| 7,278,239 B1 | 10/2007 | West | |
| 2008/0105604 A1 | 5/2008 | Weis et al. | |
| 2012/0118392 A1 * | 5/2012 | Blankenstein et al. | 137/544 |

OTHER PUBLICATIONS

Chanson, "The Hydraulics of Open Channel Flow: An introduction", Elsevier Butterworth-Heinemann, 2004 (2004), pg. 67, 191, 195, 355, 356, 373, 376.

Web page, PISTA® grit removal system (1 page), no date.

* cited by examiner

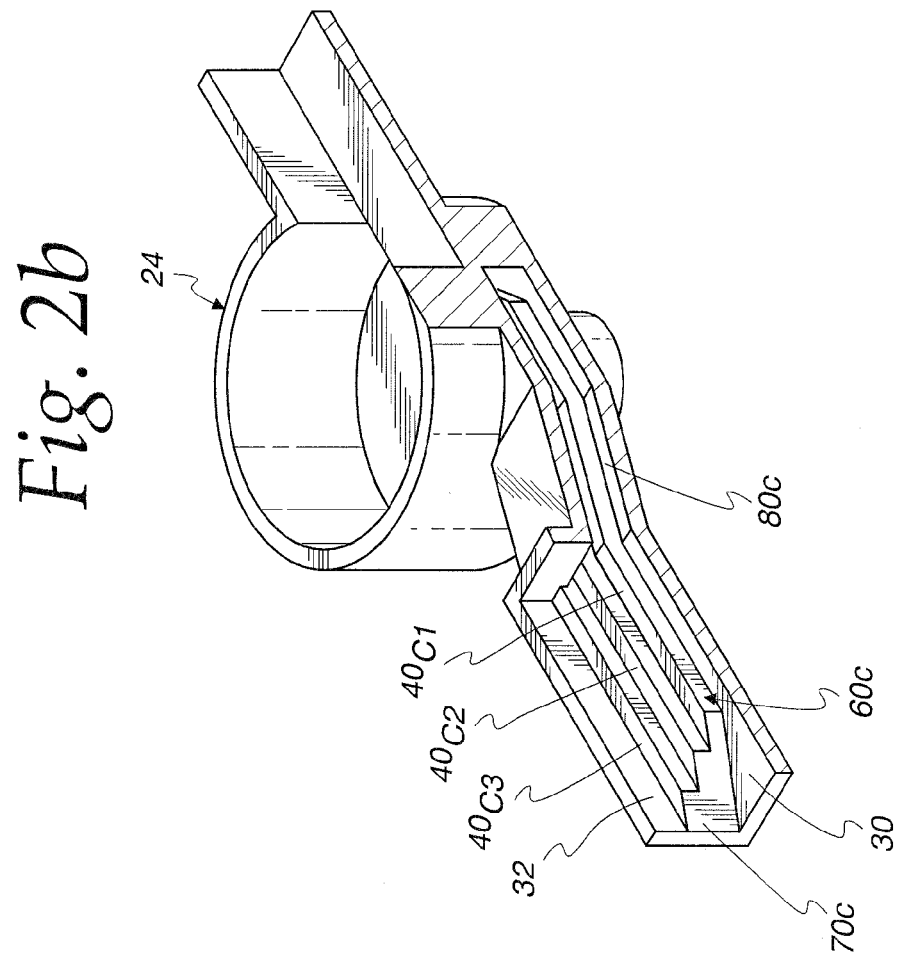
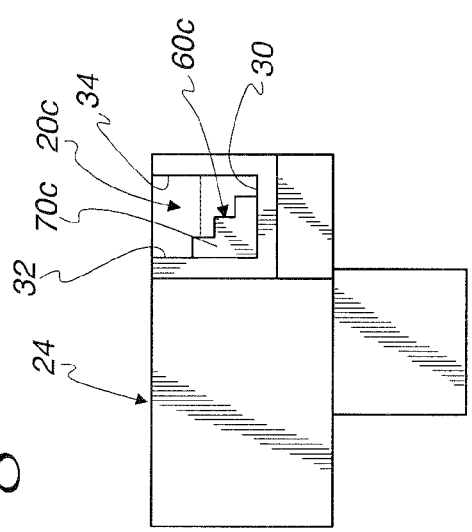

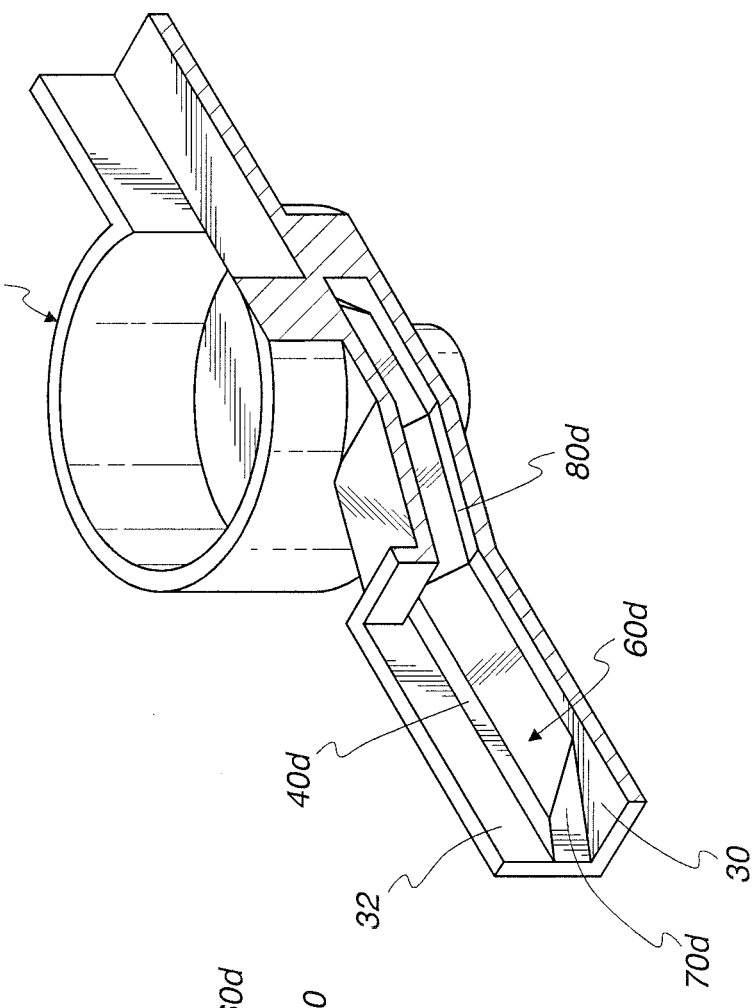
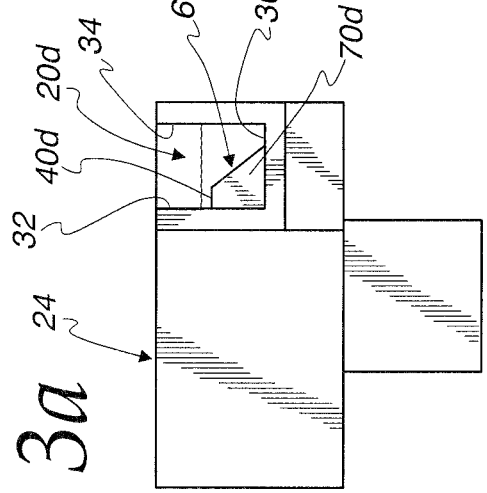

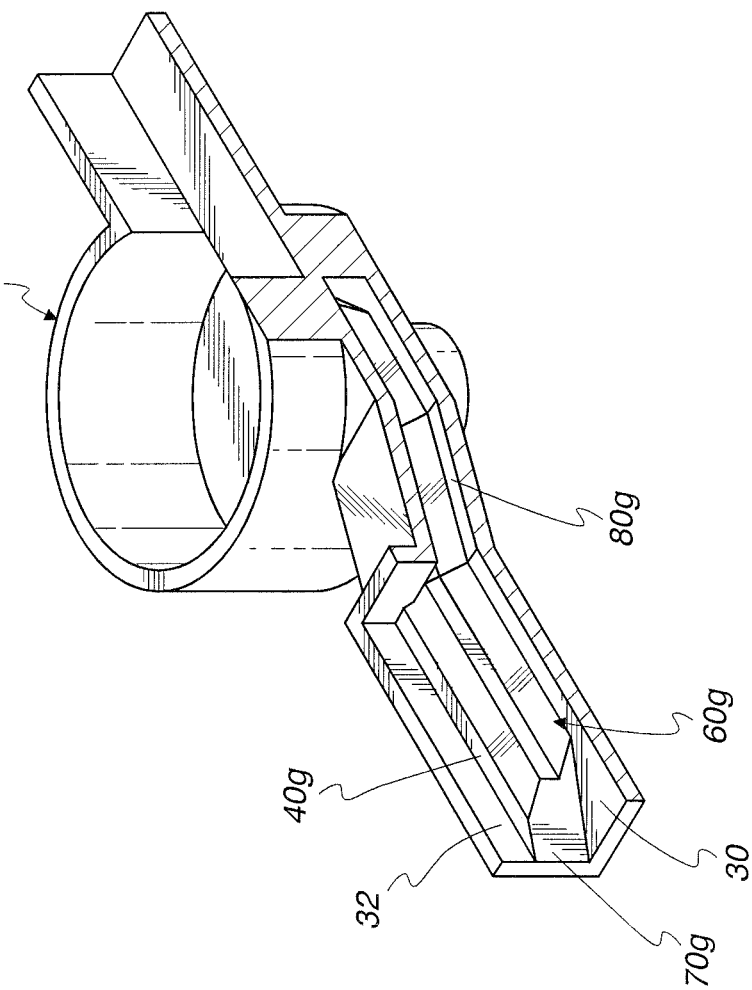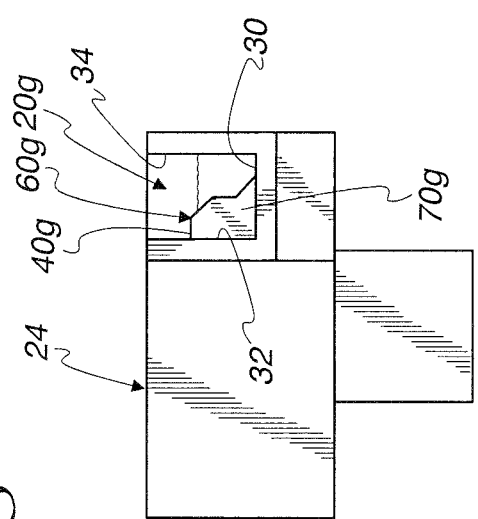

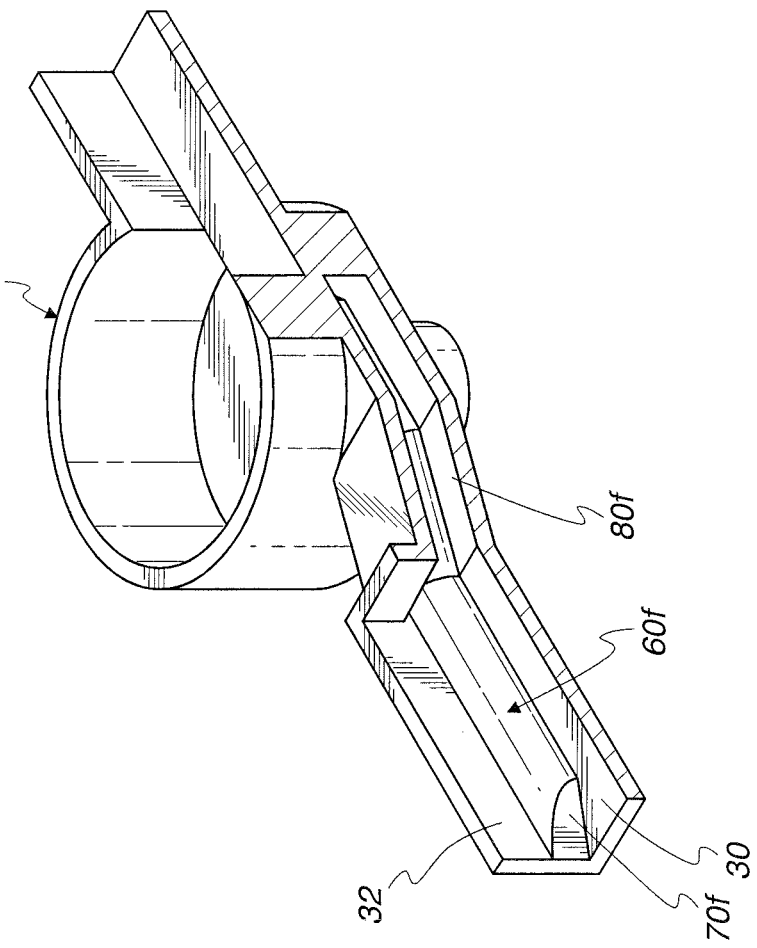
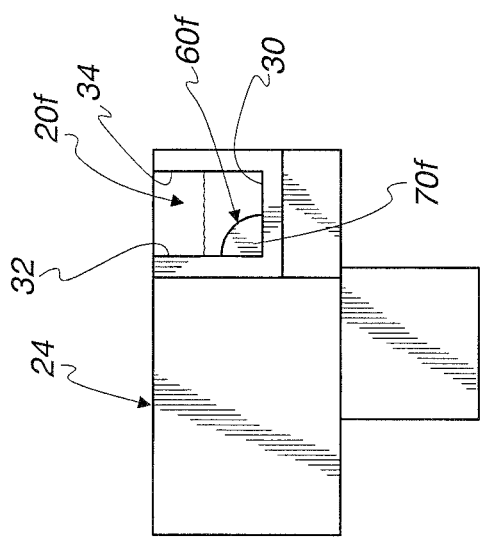

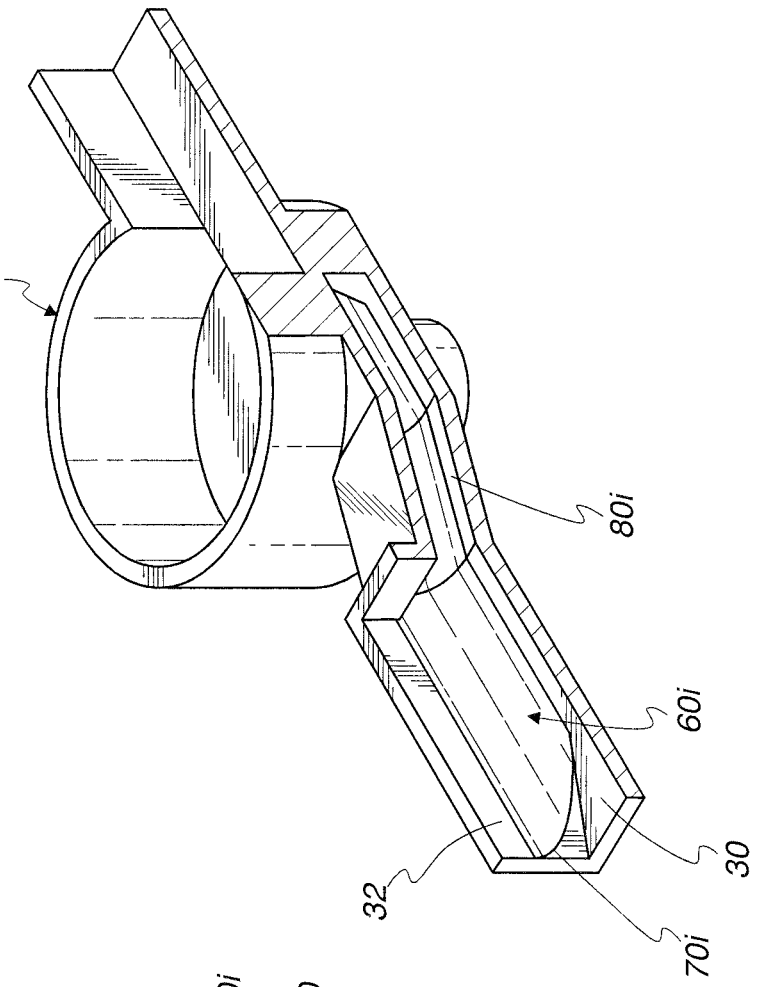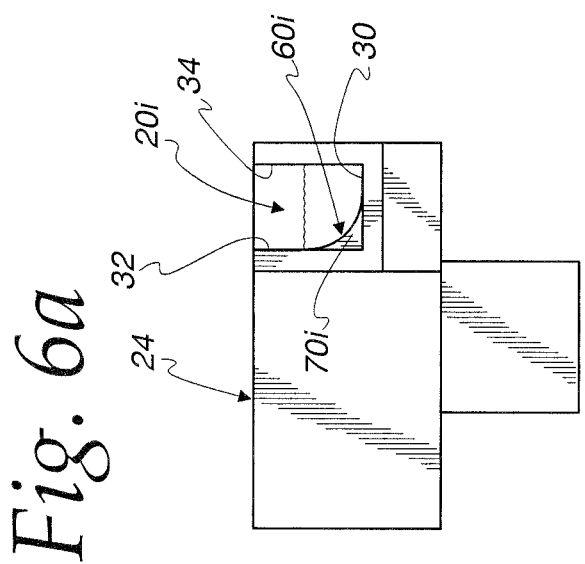

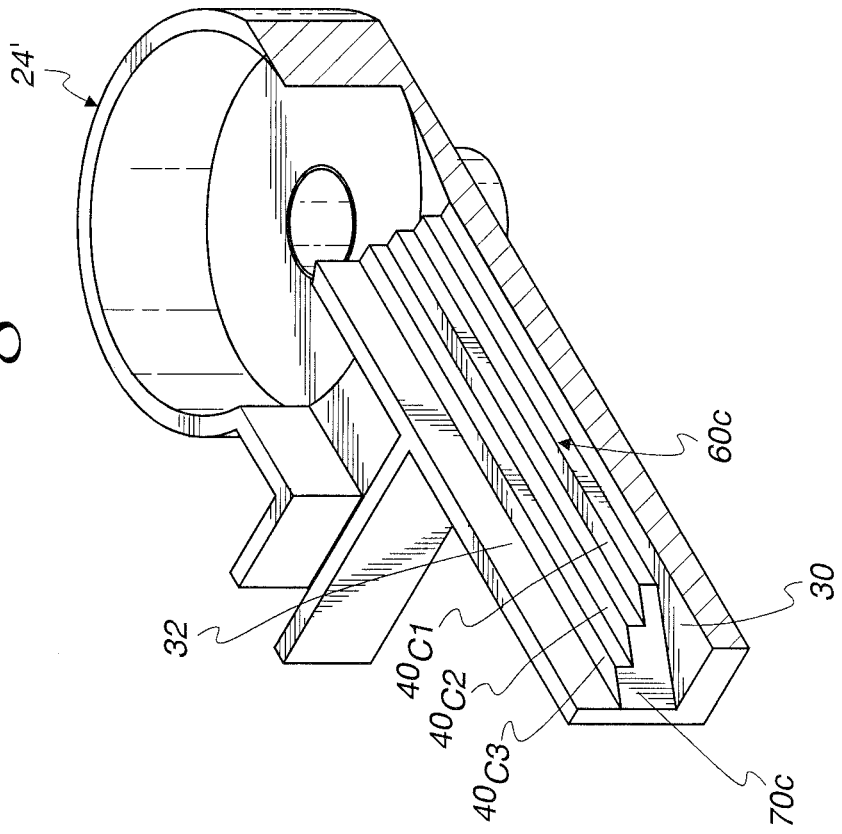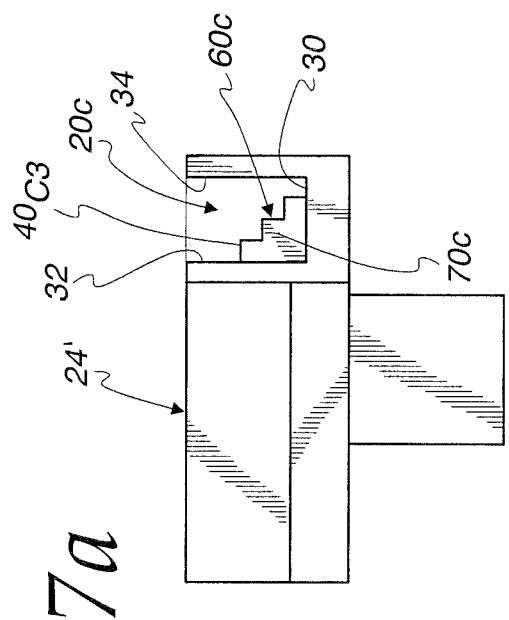

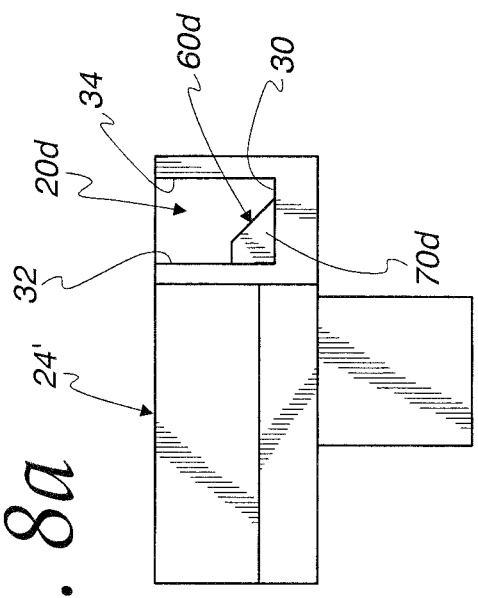
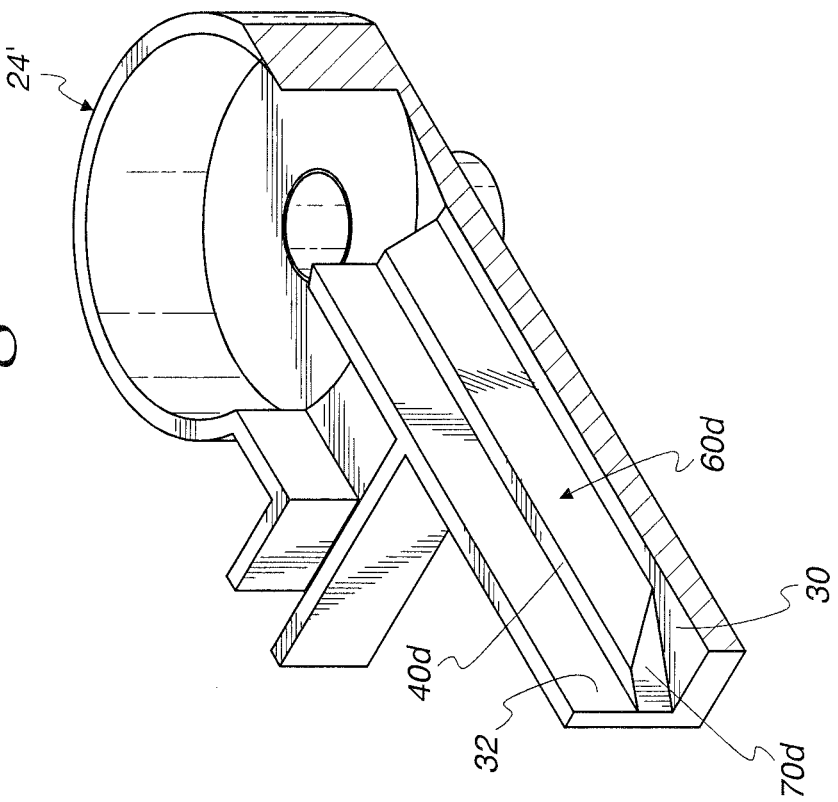

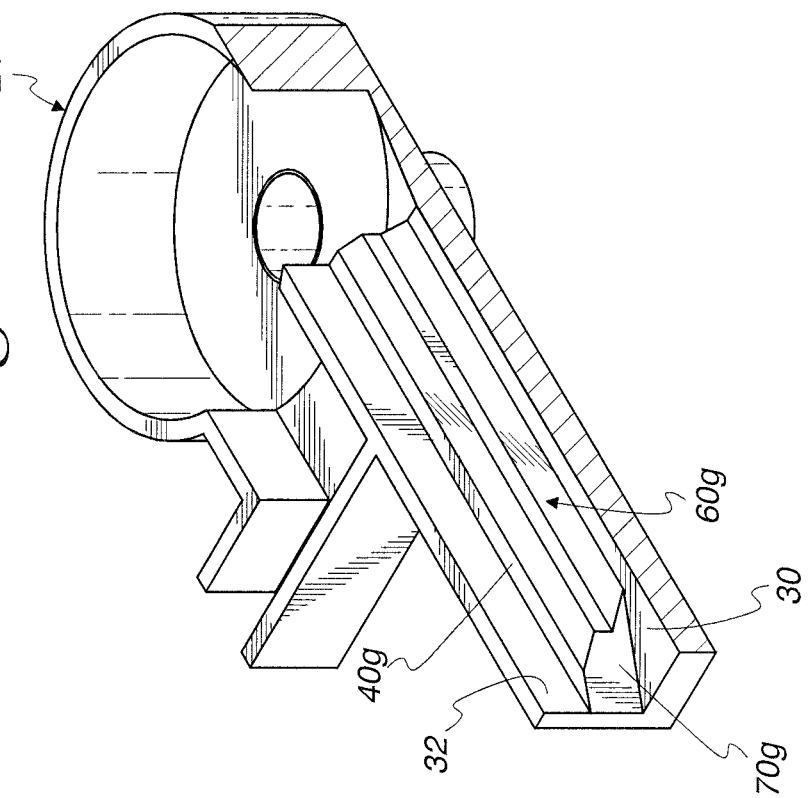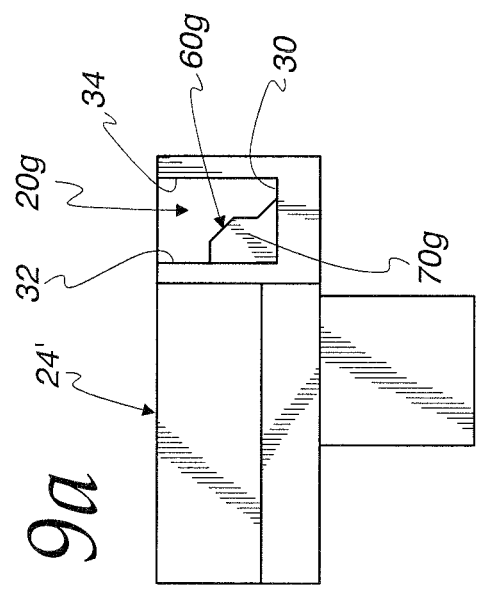

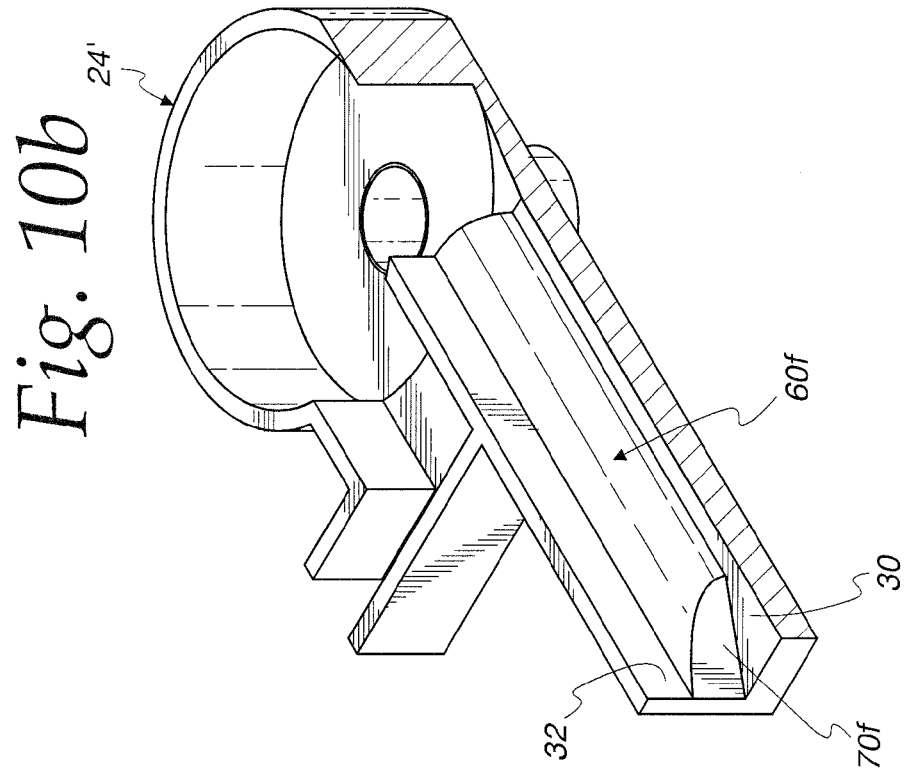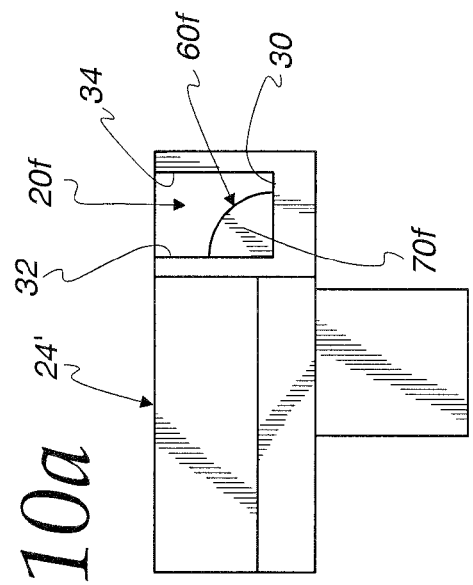

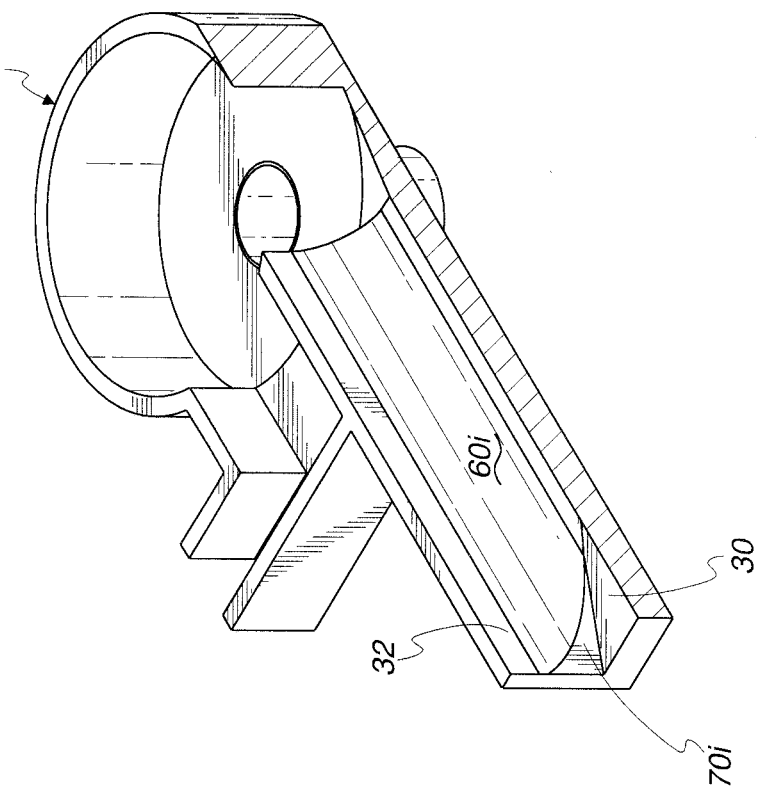
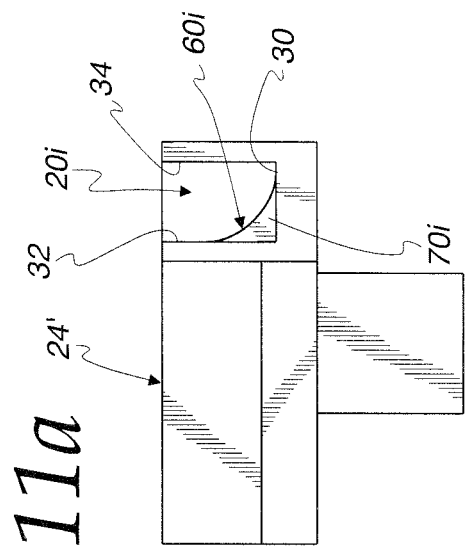

VARIABLE INFLUENT FLOW CHANNEL BAFFLE

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates to a flow channel, and more particularly to an input flow channel for the flow of waste water into a grit removal system of a waste treatment system.

BACKGROUND OF THE INVENTION AND TECHNICAL PROBLEMS POSED BY THE PRIOR ART

In virtually all industrial and municipal waste systems, waste water is laden with grit which must be removed from the water for proper processing and to protect downstream equipment. Grit removal systems such as grit extractors or grit traps have been used in many waste water treatment systems to remove grit from the waste water prior to passing the water onto further process and collect the grit to transfer to a recovery device of the system.

Grit removal systems operate according to a variety of methods. For example, some facilities hold grit-laden water in oversized storage tanks and allow the grit to settle out of the water over time. Other facilities use air induced flow patterns or forced vortex methods to separate grit from the water.

For example, one advantageous grit removal system includes an apparatus which includes flumes for injecting and extracting liquid (e.g., waste water) tangentially relative to a round chamber, thus creating a forced vortex in the chamber. The grit-laden waste water flows through a channel from an upstream portion of the waste water system and then into the round chamber of the grit removal system. Flow velocity into the round chamber facilitates operation of the grit removal system by creating a circular flow stream which causes the grit to settle near the bottom center of the round chamber. The grit in the input waste water is thus removed from the liquid stream and collected in the storage chamber for relatively easy removal. Such an apparatus is disclosed in U.S. Pat. No. 6,811,697 B2, the full disclosure of which is hereby incorporated by reference.

As another example, U.S. Pat. No. 4,767,532 (the full disclosure of which is hereby incorporated by reference) similarly discloses an apparatus for removing grit in which a grit storage chamber is provided beneath the center of the round chamber of the grit removal system. Liquid flow in the round chamber causes grit particles to settle toward the chamber floor, where they are urged radially inwardly so as to drop through an opening into a grit storage chamber.

U.S. Pat. Nos. 3,941,698 and 4,107,038 and U.S. Published Patent Application No. 2008/0105604 A1 also disclose grit extractor apparatuses. The disclosures of all of these patent documents are also hereby fully incorporated by reference.

Excellent grit removal systems are available, for example, from Smith & Loveless, Inc. of 14040 Santa Fe Trail Drive, Lenexa, Kans. 66215-1284, including its PISTA® grit removal system which has a flat bottomed grit chamber and operates on the forced vortex principal.

While those grit removal systems which use storage tanks remove grit based on retention time in the tanks, the more proactive grit removal systems (e.g., those relying on the vortex principal) operate most efficiently when the flow velocity of the waste water entering the system is within a design range. However, it should be appreciated that the flow of waste water into the channel to the round chamber may significantly vary. Moreover, it should be appreciated that since grit (including sand) in waste water does not float or flow consistently, if the velocity of flow is not sufficiently high the grit and sand may not be maintained in suspension and pushed down the channel, in which case it will settle to the bottom of a channel before reaching the grit removal system where it can be properly removed from the system.

In many areas, the flow rate of waste water may vary widely during a given day, as water use in the community and industry in the area, even if predictable, will seldom be uniform (e.g., a factory may discharge large amounts of waste water at different times of the day, and/or individual users may generate more load in the morning than at midnight).

Further, water usage may vary widely over the design life of a waste water system. For example, systems are often built to be able to handle a maximum load which may not be anticipated to occur for many years (e.g., when a new community is built out). Until that build out occurs, flow rates could be significantly less than designed for. Similarly, waste water systems built years ago to handle an anticipated maximum load may now find that the maximum load anticipated years ago will never occur (e.g., because planned buildings were never built, and/or home and industry usage became more efficient than was anticipated when the waste system was built).

Given these flow variations and a desire to minimize such variations in the flow velocity in the input channel and into the grit removal systems, attempts have been made to modify the rate.

For example, the input channels are generally formed of concrete with vertical side walls and flat bottoms, and where the flow velocity through such a channel (which is based on the actual flow rate of waste water at a given facility) has been found to be of an insufficient volume, concrete blocks or a vertical steel plate (fastened in place) have been placed in the channel to create a different vertical side wall which narrows the channel and thereby increases the flow velocity through the channel.

Additionally, baffles have been included in the grit removal system to direct waste water flow through the system so as to facilitate the desired vortex flow, such as shown in U.S. Pat. No. 6,811,697 B2. However, even with such improvements, a low flow volume in the input channel may result in a low velocity within the channel itself. As mentioned, insufficient flow velocity in the input channel can result in grit settling and accumulating in the channel rather than enter the grit removal system and be removed, in which case the settled grit will not be handled and removed by the system, but instead will undesirably accumulate in the channel and detrimentally effect the operational performance of the unit.

In short, it has heretofore been desirable, but difficult, to maintain the waste water flow velocity in the channels discharging into a grit removal system operating on the vortex principal within a design range. As a result, not only have such grit removal systems potentially been caused to operate inefficiently, but grit has also separated from the fluid at locations where the grit is not intended to be handled (e.g., in the input channel) and thus has undesirably accumulated at such locations.

The present invention is directed toward overcoming one or more of the problems set forth above.

SUMMARY OF THE INVENTION

The present invention provides a novel, improved structure and method for ensuring that the flow velocity of waste water containing grit to be removed will be sufficiently high to carry the grit to a grit removal system. This is accomplished with a unique structure which enables structures to accommodate different flow rates of waste water, including flow rates which may differ from the originally anticipated flow rates at the time the waste treatment facility is designed and built.

In one aspect of the present invention, a method of making an input channel having a depth D for the flow of waste water into a grit removal unit is provided, including the step of forming one side wall of the channel to vary the channel width over the depth of the channel, whereby (a) the width at the bottom of the channel is $W_B$, (b) the width at the top of the channel is $W_T$, and (c) the width at channel depth "d" above the bottom of the channel is $W_d$, wherein (i) $0 \leq d \leq D$, (ii) $W_B < W_T$, and (iii) $W_d$ is greater than or equal to the channel widths at substantially every channel depth less than "d".

In one form of this aspect of the present invention, the channel width is varied according to a selected one of a group of anticipated variances in the flow rate of waste water, where (1) the one side wall is shaped in steps whereby the width of the channel $W_d$ is varied over the depth of the channel in stepwise fashion when the flow rate of waste water is anticipated to involve substantially predictable volumes of waste water at different time periods, (2) the one side wall is shaped substantially flat and tilted away from the other side wall whereby the width of the channel W is varied in substantially uniform fashion when the flow rate of waste water is anticipated to change substantially evenly, and (3) the one side wall is shaped substantially curved away from the other side wall whereby W is varied in substantially non-linear fashion when the flow rate of waste water is anticipated to change substantially non-linearly.

In another form of this aspect of the present invention, first and second flow rates of waste water through the input channel are expected, with the second flow rate being greater than the first flow rate, and the one side wall is shaped in steps. The channel width is $W_1$ in the bottom for the channel for a depth $d_1$, the channel width is $W_2$ for a depth $d_2$ above depth $d_1$, $W_1 = W_B$, and $W_1 < W_2$, whereby a channel cross sectional opening of ($W_1 \times d_1$) provides a water flow velocity in a desired range for the first flow rate of water, and a channel cross sectional opening of ($[W_1 \times d_1] + [W_2 \times d_2]$) provides a water flow velocity in the desired range for the second flow rate of water. In one further form, a third flow rate of waste water through the input channel is expected, the third flow rate being greater than the second flow rate, the channel width is $W_3$ for a depth $d_3$ above depth $d_1 + d_2$, $W_2 < W_3$, and a channel cross sectional opening of ($[W_1 \times d_1] + [W_2 \times d_2] + [W_3 \times d_3]$) provides a water flow velocity in the desired range for the third flow rate of water. In another further form, the expected flow rates of waste water are expected flow rates over the design life of the grit removal unit. In still another further form, the expected flow rates of waste water are different than the flow rates expected when the channel was built In still another form of this aspect of the present invention, the one side wall is shaped whereby the flow rate of waste water will result in a depth $d_{FR}$ and the cross sectional opening of the input channel at depth $d_{FR}$ provides a flow velocity of the waste water in a desired range.

In yet another form of this aspect of the present invention, the one side wall is curved to non-linearly increase the width of the channel as the depth of the channel increases.

In a further form of this aspect of the present invention, at substantially every depth in the channel up to depth $d_T$, the one side wall is formed so that the channel width is greater than the channel width at substantially every height therebelow.

In a still further form of this aspect of the present invention, an input channel initially formed with a flat bottom and two vertical sides is retrofitted by the steps of (1) adding a baffle along one side of the input channel to restrict the cross sectional opening allowing flow of water therethrough, the baffle selectively narrowing the width of the channel to less than $W_T$ to aid in increasing the velocity of the flow, and (2) securing the baffle in the input channel. In a further form, the baffle is anchored to the input channel along the one side. In another further form, ballast is added to the baffle to weigh the baffle down onto the bottom of the input channel.

In another aspect of the present invention, an input channel for the flow of waste water into a grit removal unit is provided. The input channel includes a flat bottom with two side walls extending upwardly from the bottom, and has a depth D extending from a flat bottom to the top of the channel. At least one of the side walls is shaped to vary the channel width over the depth of the channel, whereby (a) the width at the bottom of the channel is $W_B$, (b) the width at the top of the channel is $W_T$, and (c) the width at channel depth "d" above the bottom of the channel is $W_d$, wherein (i) $0 \leq d \leq D$, (ii) $W_B < W_T$, and (iii) $W_d$ is greater than or equal to the channel widths at substantially every channel depth less than "d".

In one form of this aspect of the present invention, the channel width is varied according to a selected one of a group of anticipated variances in the flow rate of waste water, where (1) the one side wall is shaped in steps whereby the width of the channel $W_d$ is varied over the depth of the channel in stepwise fashion when the flow rate of waste water is anticipated to involve substantially predictable volumes of waste water at different time periods, (2) the one side wall is shaped substantially flat and tilted away from the other side wall whereby the width of the channel the width of the channel W is varied in substantially uniform fashion when the flow rate of waste water is anticipated to change substantially evenly, and (3) the one side wall is shaped substantially curved away from the other side wall whereby W is varied in substantially non-linear fashion when the flow rate of waste water is anticipated to change substantially non-linearly.

In another form of this aspect of the present invention, first and second flow rates of waste water through the input channel are expected, with the second flow rate being greater than the first flow rate, and the one side wall is shaped in steps. The channel width is $W_1$ in the bottom for the channel for a depth $d_1$, the channel width is $W_2$ for a depth $d_2$ above depth $d_1$, $W_1 = W_B$, and $W_1 < W_2$, whereby a channel cross sectional opening of ($W_1 \times d_1$) provides a water flow velocity in a desired range for the first flow rate of water, and a channel cross sectional opening of ($[W_1 \times d_1] + [W_2 \times d_2]$) provides a water flow velocity in the desired range for the second flow rate of water. In one further form, a third flow rate of waste water through the input channel is expected, the third flow rate being greater than the second flow rate, the channel width is $W_3$ for a depth $d_3$ above depth $d_1 + d_2$, $W_2 < W_3$, and a channel cross sectional opening of ($[W_1 \times d_1] + [W_2 \times d_2] + [W_3 \times d_3]$) provides a water flow velocity in the desired range for the third flow rate of water. In another further form, the expected flow rates of waste water are expected flow rates over the design life of the grit removal unit. In still another further form, the expected flow rates of waste water are different than the flow rates expected when the channel was built In still another form of this aspect of the present invention, the one side wall is shaped whereby the flow rate of waste water will result in a depth $d_{FR}$ and the cross sectional opening of the input channel at depth $d_{FR}$ provides a flow velocity of the waste water in a desired range.

In yet another form of this aspect of the present invention, the one side wall is curved to non-linearly increase the width of the channel as the depth of the channel increases.

In a further form of this aspect of the present invention, at substantially every depth in the channel up to depth $d_T$, the one side wall is formed so that the channel width is greater than the channel width at substantially every height therebelow.

In a still further form of this aspect of the present invention, the one side wall of the input channel is defined by a baffle extending substantially the length of the channel and restricting the cross sectional open area of the channel allowing the flow of water through the channel, the baffle selectively narrowing the width of the channel to less than $W_T$ to aid in increasing the velocity of the flow. In a further form, the baffle is secured adjacent the one side of the channel by an anchor system. In another further form, the baffle is hollow and can be filled with ballast sufficient to hold the baffle on the bottom of the input channel.

BRIEF DESCRIPTION OF THE DRAWINGS

FIG. 1 is a group of cross sectional views illustrating input channels with baffles according to the present invention and two different waste water levels, wherein:

FIGS. 2-6 illustrate various of the baffles in FIG. 1 as used in conjunction with a grit removal system such as taught in previously discussed U.S. Pat. No. 6,811,697 B2, wherein view "a" is a cross sectional view similar to FIG. 1 and view "b" is a perspective view with one side of the channel broken away for illustrative purposes, wherein:

FIG. 2 illustrates the baffle of FIG. 1c,
FIG. 3 illustrates the baffle of FIG. 1d,
FIG. 4 illustrates the baffle of FIG. 1g,
FIG. 5 illustrates the baffle of FIG. 1f; and
FIG. 6 illustrates the baffle of FIG. 1i; and FIGS. 7-11 illustrate various of the baffles in FIG. 1 as used in conjunction with an alternate grit removal system (such as taught in previously discussed U.S. Pat. No. 4,107,038), wherein view "a" is a cross sectional view similar to FIG. 1 and view "b" is a perspective view with one side of the channel broken away for illustrative purposes, wherein:

FIG. 7 illustrates the baffle of FIG. 1c,
FIG. 8 illustrates the baffle of FIG. 1d,
FIG. 9 illustrates the baffle of FIG. 1g,
FIG. 10 illustrates the baffle of FIG. 1f; and
FIG. 11 illustrates the baffle of FIG. 1i.

DETAILED DESCRIPTION OF THE INVENTION

Figure 1A:
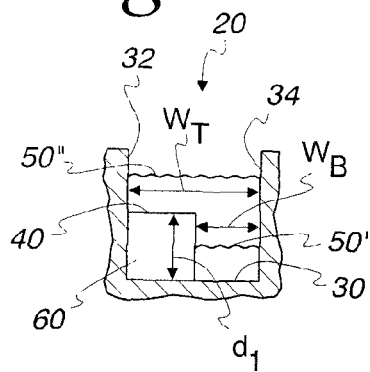
FIGS. 1a-1c illustrate stepped baffles, with one step in FIG. 1a, two steps in FIG. 1b, and three steps in FIG. 1c.

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus operating in accordance with this invention is described in the normal (upright) operating position, and terms such as upper, lower, horizontal, etc., are used with reference to this position.

The apparatus of this invention can have certain conventional components and control mechanisms the details of which, although not fully illustrated or described, will be apparent to those having skill in the art and an understanding of the necessary functions of such components and mechanisms.

Some of the Figures illustrating the preferred embodiment of the apparatus of the present invention show conventional structural details and mechanical elements or components that will be recognized by one skilled in the art. However, the detailed descriptions of such elements are not necessary to an understanding of the invention, and accordingly, are herein presented only to the degree necessary to facilitate an understanding of the novel features of the present invention.

Channels 20 are provided in waste treatment systems to carry the flow of waste water to and through a treatment facility. The physical dimensions of the channels 20 vary from location to location, and are not able to change easily since they are normally constructed of concrete to a predefined dimension. The channels 20 are also normally rectangular in the cross-sectional shape, in which the flow volume and hydraulic profile (water depth) through the channel 20 will vary over periods of time. This flow volume is normally based on the design calculations for the peak flow volume that the waste treatment system is required to treat, including projections for the future flow rates. These peak volumes consider the ultimate population projections, anticipated development, collection system condition, and watershed characteristics. At the same time, it should be appreciated that the projected peak flow volumes may not be encountered for a long period of time.

To produce consistent results, wastewater components require a flow velocity to be within a certain range, which is difficult to accomplish given the different flow volumes encountered, even when projected flow volumes are accurate. The present invention allows such flow velocities to be kept within the desired ranges over the predefined flow volumes.

In particular, in those systems in which the waste water carries fine particles such as grit, sand and the like in suspension, it is typically necessary to remove those fine particles by use of a grit removal system or unit 24 (see, e.g., FIG. 2). In accordance with the illustrated embodiments of the present invention, the channels 20 which are used at the input of the grit removal system 24 are configured to ensure that, notwithstanding different flow volumes or rates of waste water, a flow velocity of the waste water will be maintained in the channel 20 which is sufficient to both enable the fine particles to be carried to the grit removal system (where they can be properly removed and handled) and also ensures that the flow velocity in the removal system 24 is sufficient for its operation.

According to the present invention, such advantageous operation can be obtained by changing the ratio of the flow path area (i.e., the open area in a cross section taken transverse to the channel 20) to depth.

Typically, flow channels 20 for waste water treatment systems have been suitably constructed (e.g., of concrete or steel) with a flat bottom 30 between two substantially vertical side walls 32, 34. The dimensions of the channel 20 (i.e., its width and its depth) are typically designed to handle the maximum expected flow rate of waste water expected during the life of the grit removal system 24. However, since the flow rate of waste water will often be at less than the maximum anticipated rate, such channels 20 may result in flow velocities which are less than desired, that is, so slow that the suspended fine particles may fall from the waste water and settle onto the bottom of the channel 20. There is no mechanism or system in the channels 20 to remove such particles.

According to the present invention, the ratio of the flow path area of the channel 20 to its depth is modified as variously illustrated in FIGS. 1a-1i.

Specifically, as illustrated in FIG. 1a, one side wall 32 is modified by adding a step 40, whereby the flow path area has a width $W_B$ at the bottom and up to a depth $d_1$, and above depth $d_1$ has a width $W_T$ substantially equal to the width at the top of the channel. It should thus be appreciated that a low flow rate may be maintained in the narrower portion of the channel 20 (up to depth d1 such as, e.g., water level 50'), where the flow velocity will be maintained at a sufficient speed.

When the flow rate surges (as may be anticipated in certain environments), the ratio of flow path area to depth will disproportionately increase. It should be appreciated that given the greater flow rate of waste water (e.g., up to water level 50"), the flow velocity will be maintained notwithstanding such a larger ratio.

Further, the present invention may be incorporated as a component of a waste treatment system, or a stand alone component. Thus, it should be appreciated that the modification to the side wall 32 can be accomplished during initial construction of the channel 20, or the modification to the side wall 32 can be accomplished by adding a baffle 60 to, for example, form the step 40 in the FIG. 1a embodiment. Thus, when the channel 20 is constructed in anticipation of a particular maximum flow rate of waste water, a suitable baffle 60 can be added when circumstances change such that the maximum flow rate is not reached as expected, or when the maximum flow rate is not anticipated until a number of years into the design life of the system.

An added baffle 60 may be manufactured, for example, of concrete formed in the desired shape and then placed along the one side wall 32 of the channel. Alternatively, the baffle 60 may be formed, for example, of steel (e.g., as a hollow steel member appropriately shaped) which is similarly placed in the channel 20 adjacent the one side wall 32. A baffle 60 consisting of a hollow formed member may be filled with suitable ballast, such as sand, to assist in ensuring that the baffle 60 stays in place as desired in the channel 20. The materials of construction may vary depending on the channel 20 and application including, inter alia, not only concrete sections or reinforced steel plates, but also plastic sections ballast with water or sand, and or nylon or vinyl sections secured to the structure (e.g., to the bottom 30 of the channel 20). It should be further appreciated that the baffle 60 may be hollow and filled with a suitable ballast (e.g., sand or water), and the ballast may not only serve to weigh down the baffle 60 but may also serve to assist in maintaining (or even creating, via inflation) the desired shape of the baffle 60.

The baffle 60 may also be advantageously secured in the channel 20, as by anchoring. The method of anchoring will vary based on the material of the baffle 60 and of the channel 20. For example, some channels have a coating or lining applied to provide protection to the channel material, in which case an anchoring method should preferably be used which will maintain the coating. Further, while channels are typically constructed out of concrete, steel is also used in some applications. Examples of anchoring structures suitable for such applications include mechanically fastening the baffle 60 to the channel wall 32 and/or 34, welding (steel installations), using a ballast material (such as water or sand), or attaching a frame, straps or tethers between the baffle 60 and the channel 20 (e.g., anchored to the bottom 30, one or both side walls 32, 34 of the channel 20, and/or a ceiling above the channel 20).

It should further be appreciated that the use of separate anchored baffles 60 can advantageously allow later changes, such as a baffle having a different size, configuration and/or type of baffle to ensure efficient and effective operation should it develop that the flow volumes and/or hydraulic profiles of the treatment plants are different than those anticipated or expected when the channel was originally designed.

Alternate embodiments of the present invention are shown in FIGS. 1b-1i. It should be appreciated that in the illustrated alternate embodiments, reference numerals corresponding to those used in connection with the FIG. 1a embodiment are used for identical components (e.g., bottom and side walls are identified by reference numerals 30, 32 and 34 in FIG. 1a, and also in FIGS. 1b-1i). Similar but different components, on the other hand, are identified by use of reference numerals with the letter designation of the Figure added (e.g., in FIG. 1a, the baffle is identified by reference numeral 60, whereas in FIG. 1b the different baffle is 60b, in FIG. 1c the still different baffle is 60c, etc.).

Figure 1B:
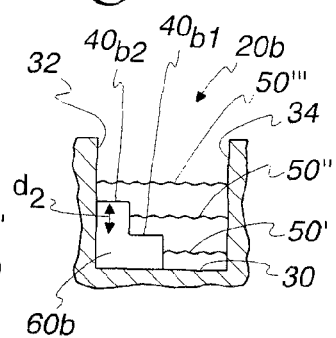
Figure 1C:
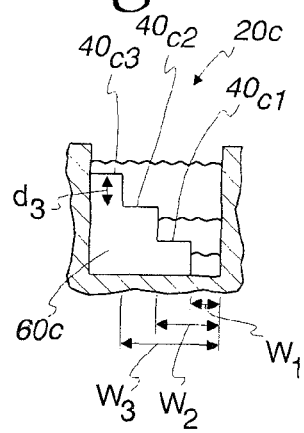

FIGS. 1b and 1c illustrate baffles 60b, 60c providing more steps, with baffle 60b providing two steps ($40_{b1}$, $40_{b2}$) and baffle 60c providing three steps ($40_{c1}$, $40_{c2}$, $40_{c3}$). Such baffles 60b, 60c may be used in applications, for example, where more than two discrete flow volumes are anticipated (e.g., water levels 50', 50", and 50'").

Figure 1D:
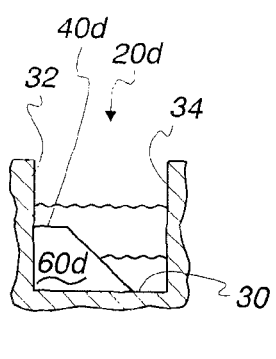
FIG. 1d illustrates a tapered baffle with a step.
Figure 1E:
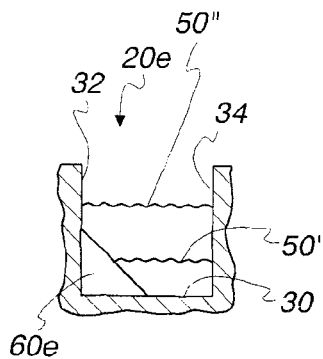
FIG. 1e illustrates a tapered baffle.

FIGS. 1d and 1e illustrate baffles 60d, 60e which are evenly tapered to widen from the bottom 30, rather than stepped, as may be advantageously used, for example, in facilities where changes in flow volumes are anticipated to occur evenly over time. The embodiment of FIG. 1d includes a step 40d at the top of the baffle 60d, which step 40d may, for example, be advantageously provided in facilities where surges of flow volumes are anticipated to occur when flow volumes exceed the volumes in which even flow volume variations are anticipated.

It should be appreciated that with such stepped baffles, different expected flow rates of waste water through the input channel can be advantageously handled. For example, a channel width $W_1$ (equal to the width at the bottom of the channel) may be provided for a depth $d_1$, with a greater channel width $W_2$ provided for a depth $d_2$ above depth $d_1$, $W_1$, then a channel cross sectional opening of ($W_1 \times d_1$) may be provided a water flow velocity in a desired range for the lower expected flow rate of water, and a channel cross sectional opening of ($[W_1 \times d_1] + [W_2 \times d_2]$) may provide a water flow velocity in the desired range for the second flow rate of water.

Similarly, where three steps are provided (e.g., when a third, higher flow rate of waste water through the input channel is expected), with a channel width $W_3$ for a depth $d_3$ above depth $d_1 + d_2$ (with $W_2 < W_3$), a channel cross sectional opening of ($[W_1 \times d_1]+[W_2 \times d_2]+[W_3 \times d_3]$) may provide a water flow velocity in the desired range for the third flow rate of water.

Figure 1F:
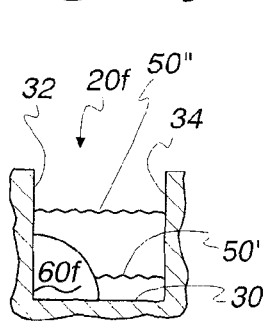
FIG. 1f illustrates a convexly curved baffle.

FIG. 1f illustrates a baffle 60f which is convexly curved to non-linearly increase the width of the channel 20f as the depth of the channel increases. Such a baffle 60f may be used, for example, in facilities where flow volumes are anticipated to change somewhat linearly (e.g., without major surges), but where the changes are expected to occur more rapidly as the flow volumes become greater.

Figure 1G:
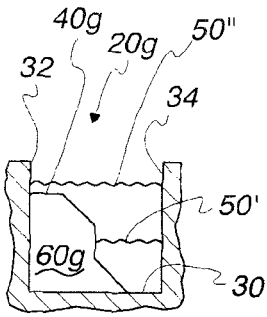
FIG. 1g illustrates a baffle having two separated tapers and a step.
Figure 1H:
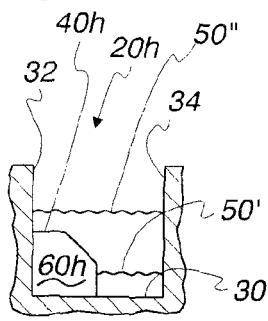
FIG. 1h illustrates a raised tapered baffle with a step.

FIGS. 1g and 1h illustrates baffle 60g, 60h which use various combinations of steps and tapers, as may be advantageously used, for example, in facilities where flow volumes are anticipated to change evenly in certain flow volume ranges and more quickly (e.g., in surges) in other flow volume ranges.

Figure 1I:
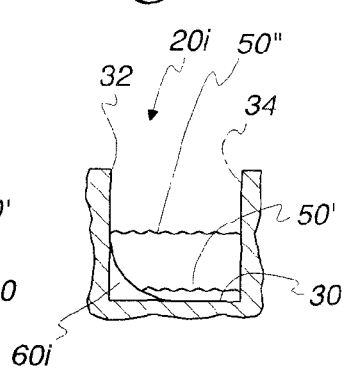
FIG. 1i illustrates a concavely curved baffle.

FIG. 1i illustrates a baffle 60i which is concavely curved, such as may be used, for example, in facilities where flow volumes are anticipated to change somewhat evenly (e.g., without major surges), but where the changes are expected to occur more slowly as the flow volumes become greater.

FIGS. 2-6 further illustrate five of the above described structures (i.e., the structures illustrated in FIGS. 1c, 1d, 1g, 1f and 1i) as configured to supply waste water to a grit removal system such as taught in previously discussed U.S. Pat. No. 6,811,697 B2.

Referring first to FIG. 2, the three stepped baffle of FIG. 1c is illustrated in channel 20c. As best seen in FIG. 2b, the baffle 60c is installed in the straight section of the channel 20c and includes a taper 70c at the front (input) or influent end to provide a smooth transition for the flow from the full channel width $W_T$ to the reduced widths defined by the steps $40_{c1}$, $40_{c2}$, $40_{c3}$. At the end of the baffle 60c near the grit removal unit 24, another transition may be provided which can vary in shape and angle based on the application (e.g., it may be tapered similar to the front end, or it may end more abruptly). The baffle 60c may also follow any elevation changes of the channel 20c, such as at the increased slope portion 80c dropping toward the grit removal unit 24 (as may be desirable, e.g., for grit removal units 24 of the type illustrated).

FIGS. 3-6 similarly illustrate the baffles 60d, 60g, 60f and 60i of FIGS. 1d, 1g, 1f and 1i respectively, including tapers 70d, 70g, 70f and 70i at the baffle front ends, and elevation changes following the slope of sloped portions 80d, 80g, 80f and 80i of the respective channels.

FIGS. 7-11 similarly illustrate the baffles 60c, 60d, 60g, 60f and 60i of FIGS. 1c, 1d, 1g, 1f and 1i respectively for input channels associated with a different design grit removal unit 24' (wherein no differently sloped portion is provided). These baffles similarly include the taper 70c, 70d, 70g, 70f and 70i at their front end and, as illustrated, abruptly end without a taper at the entrance to the grit removal unit 24'.

It should be appreciated that the particular configuration of the present invention which is most suitable for a particular waste treatment facility may be advantageously determined using suitable calculations or Computational Fluid Dynamics (CFD) modeling based on the hydraulics of the application (i.e., flow volume ranges, the degree of change in flow volumes, flow velocities, and the hydraulic profile), as well as the expected flow volumes (i.e., maximum [peak] flow volumes, average flow volumes, and the minimum flow volume anticipated), the time of the change between flow volumes, and the expected duration of the period of flows. Moreover, while it should be appreciated that a baffle profile that is the most effective at controlling the velocity in the channel for the expected range of flows and water depths may be advantageously used, even baffle profiles which are not most effective may nonetheless be advantageously used to improve operation of the waste water treatment system.

Beyond the configuration or shape of the baffle, the size of the baffles may also be advantageously determined so that (1) the velocity in the channel at the expected maximum flow (and consequently the highest water level) will be close to the maximum desired channel velocity and, conversely, (2) the velocity in the channel at the expected low flow volume will be near the minimum desired flow velocity. This will give the largest range of flows that will have channel velocities in the desired range.

It should further be appreciated that using baffles 60 according to the present invention will allow for the flow velocities to be maintained in a desired range over a larger range of flow volumes (and thereby allow the associated grit removal system 24 to operate most efficiently and effectively). The larger range of flow volumes will thus provide advantageous operation over long periods of time.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A method of making an input channel for the flow of waste water into a grit removal unit, wherein said input channel has a depth D, comprising the step of forming one side wall of the channel to vary the channel width over the depth of the channel whereby:
   the width at the bottom of the channel is $W_B$,
   the width at the top of the channel is $W_T$, and
   the width at channel depth "d" above the bottom of the channel is $W_d$, wherein
   $0 \leq d \leq D$,
   $W_B < W_T$, and
   $W_d$ is greater than or equal to the channel widths at substantially every channel depth less than "d";
   wherein
   first and second flow rates of waste water through the input channel are expected, said second flow rate being greater than said first flow rate;
   the one side wall is shaped in steps wherein
   the channel width is $W_1$ in the bottom for the channel for a depth $d_1$,
   the channel width is $W_2$ for a depth $d_2$ above depth $d_1$,
   $W_1 = W_B$, and
   $W_1 < W_2$;
   a channel cross sectional opening of ($W_1 \times d_1$) provides a water flow velocity in a desired range for the first flow rate of water; and
   a channel cross sectional opening of ($[W_1 \times d_1]+[W_2 \times d_2]$) provides a water flow velocity in the desired range for the second flow rate of water.

2. The method of claim 1, wherein:
   a third flow rate of waste water through the input channel is expected, said third flow rate being greater than said second flow rate;
   the channel width is $W_3$ for a depth $d_3$ above depth $d_1+d_2$; $W_2 < W_3$; and
   a channel cross sectional opening of ($[W_1 \times d_1]+[W_2 \times d_2]+[W_3 \times d_3]$) provides a water flow velocity in the desired range for the third flow rate of water.

3. The method of claim 1, wherein the expected flow rates of waste water are expected flow rates over the design life of the grit removal unit.

4. The method of claim 1, wherein the expected flow rates of waste water are different than the flow rates expected when the channel was built.

5. A method of making an input channel for the flow of waste water into a grit removal unit, wherein said input channel has a depth D, comprising the step of forming one side wall of the channel to vary the channel width over the depth of the channel, whereby:
the width at the bottom of the channel is $W_B$,
the width at the top of the channel is $W_T$, and
the width at channel depth "d" above the bottom of the channel is $W_d$, wherein
$0 \leq d \leq D$,
$W_B < W_T$, and
$W_d$ is greater than or equal to the channel widths at substantially every channel depth less than "d"; and
the one side wall is formed by retrofitting an input channel initially formed with a flat bottom and two vertical sides by the steps of:
adding a baffle along one side of the input channel to restrict the cross sectional opening allowing flow of water therethrough, said baffle selectively narrowing the width of the channel to less than $W_T$ to aid in increasing the velocity of the flow; and
securing the baffle in the input channel.

6. The method of claim 5 further comprising the step of anchoring the baffle to the input channel along said one side.

7. The method of claim 5, further comprising the step of adding ballast to said baffle to weigh the baffle down onto the bottom of the input channel.

8. The method of claim 5, wherein said one side wall is curved to non-linearly increase the width of the channel as the depth of the channel increases.

9. The method of claim 5, wherein at substantially every depth in the channel up to depth $d_T$, the one side wall is formed so that the channel width is greater than the channel width at substantially every height therebelow.

10. An input channel for the flow of waste water into a grit removal unit, said input channel comprising a flat bottom with two side walls extending upwardly from the bottom, wherein:
said input channel has a depth D extending from a flat bottom of the channel; and
at least one of said side walls shaped to vary the channel width over the depth of the channel, whereby:
the width at the bottom of the channel is $W_B$,
the width at the top of the channel is $W_T$, and
the width at channel depth "d" above the bottom of the channel is $W_d$, wherein
$0 \leq d \leq D$,
$W_B < W_T$, and
$W_d$ is greater than or equal to the channel widths at substantially every channel depth less than "d";
first and second flow rates of waste water through the input channel are expected, said second flow rate being greater than said first flow rate, and
the one side wall is shaped in steps wherein
the channel width is $W_1$ in the bottom for the channel for a depth $d_1$,
the channel width is $W_2$ for a depth $d_2$ above depth $d_1$,
$W_1 = W_B$, and
$W_1 < W_2$;
a channel cross sectional opening of ($W_1 \times d_1$) provides a water flow velocity in a desired range for the first flow rate of water; and
a channel cross sectional opening of ($[W_1 \times d_1] + [W_2 \times d_2]$) provides a water flow velocity in the desired range for the second flow rate of water.

11. The input channel of claim 10, wherein
a third flow rate of waste water through the input channel are expected, said third flow rate being greater than said second flow rate;
the channel width is $W_3$ for a depth $d_3$ above depth $d_1 + d_2$;
$W_2 < W_3$; and
a channel cross sectional opening of ($[W_1 \times d_1] + [W_2 \times d_2] + [W_3 \times d_3]$) provides a water flow velocity in the desired range for the third flow rate of water.

12. The input channel of claim 10, wherein the expected flow rates of waste water are expected flow rates over the design life of the grit removal unit.

13. The input channel of claim 10, wherein the expected flow rates of waste water are different than the flow rates expected when the channel was built.

14. An input channel for the flow of waste water into a grit removal unit, said input channel comprising a flat bottom with two side walls extending upwardly from the bottom, wherein:
said input channel has a depth D extending from a flat bottom of the channel; and
at least one of said side walls shaped to vary the channel width over the depth of the channel, whereby:
the width at the bottom of the channel is $W_B$,
the width at the top of the channel is $W_T$, and
the width at channel depth "d" above the bottom of the channel is $W_d$, wherein
$0 \leq d \leq D$,
$W_B < W_T$, and
$W_d$ is greater than or equal to the channel widths at substantially every channel depth less than "d"; and
said one side wall is defined by a baffle extending substantially the length of the channel and restricting the cross sectional open area of the channel allowing the flow of water through said channel, said baffle selectively narrowing, the width of the channel to less than $W_T$ to aid in increasing the velocity of the flow.

15. The input channel of claim 14, wherein said baffle is secured adjacent to one side of said channel by an anchor system.

16. The input channel of claim 14, wherein said baffle is hollow and filled with ballast sufficient to hold the baffle on the bottom of the input channel.

17. The input channel of claim 14, wherein said one side wall is curved to non-linearly increase the width of the channel as the depth of the channel increases.

18. The input channel of claim 14, wherein at substantially every depth in the channel up to depth $d_T$, the channel width is greater than the channel width at substantially every height therebelow.

* * * * *